Feb. 24, 1970  M. S. JETT, JR  3,496,585
METHOD OF MAKING A SHOE UPPER
Filed April 29, 1968  3 Sheets-Sheet 1
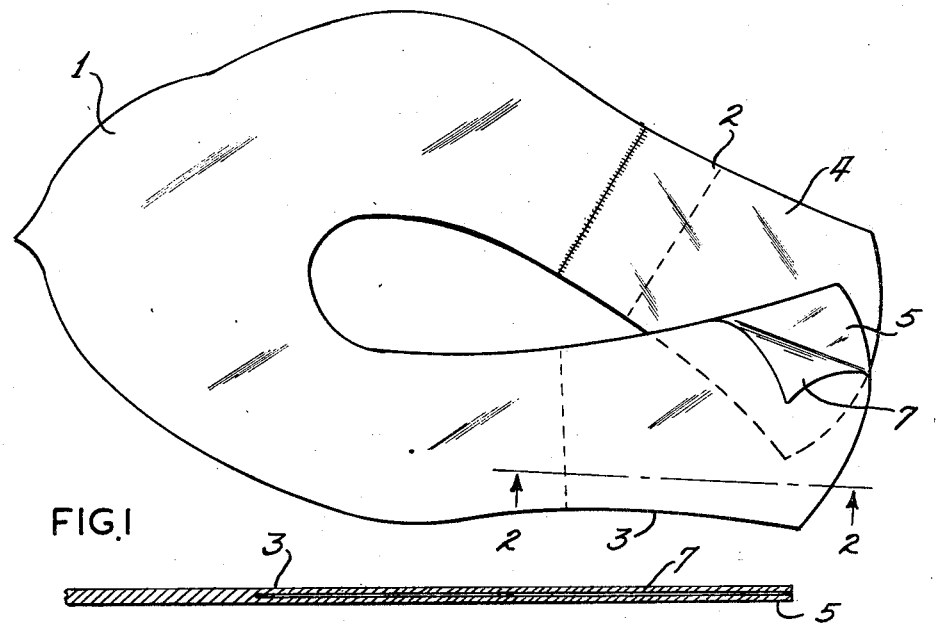
FIG.1
FIG.2
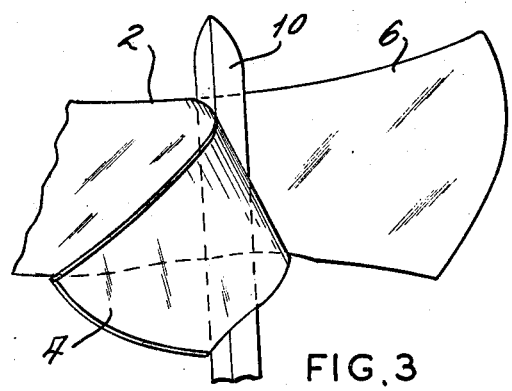
FIG.3
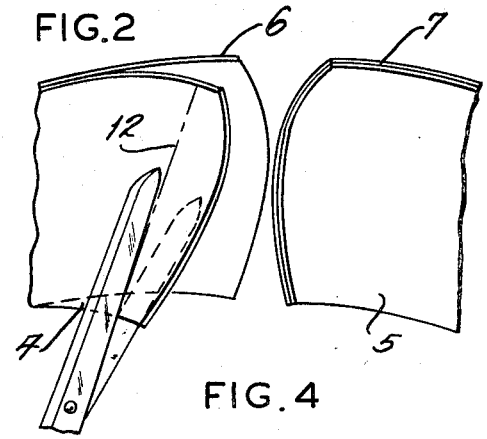
FIG.4
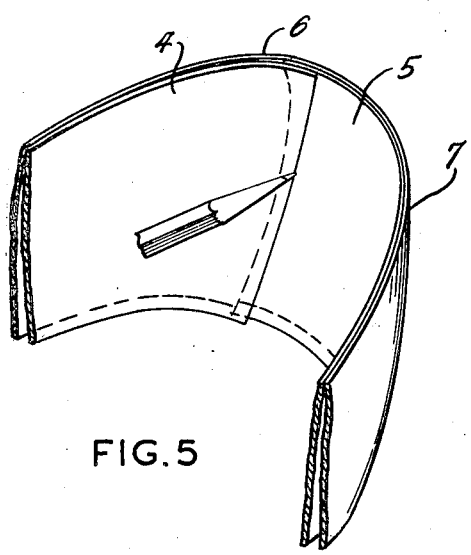
FIG.5
INVENTOR:
MARVIN S. JETT, JR.
BY
ATTORNEY, Feb. 24, 1970  M. S. JETT, JR  3,496,585
METHOD OF MAKING A SHOE UPPER
Filed April 29, 1968  3 Sheets-Sheet 2

INVENTOR:
MARVIN S. JETT, JR.
BY
ATTORNEY.

Feb. 24, 1970 M. S. JETT, JR 3,496,585
METHOD OF MAKING A SHOE UPPER
Filed April 29, 1968 3 Sheets-Sheet 3
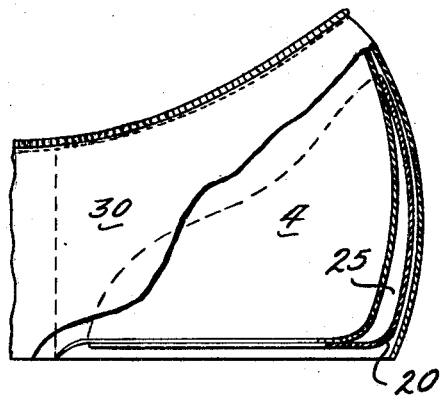
FIG.11
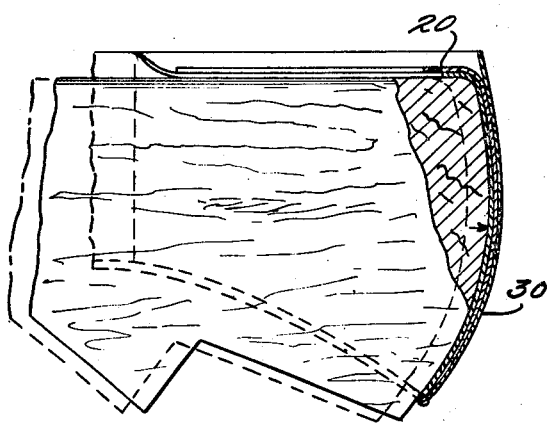
FIG.12
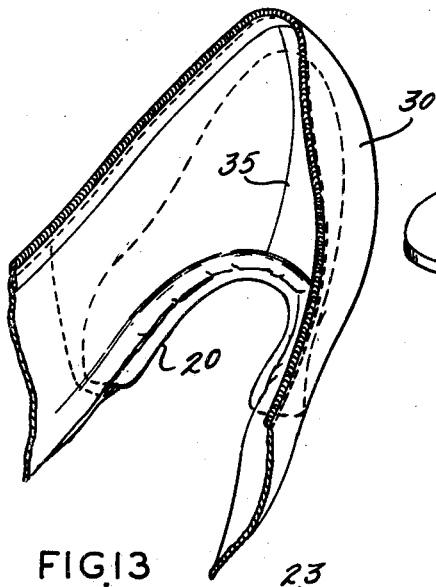
FIG.13
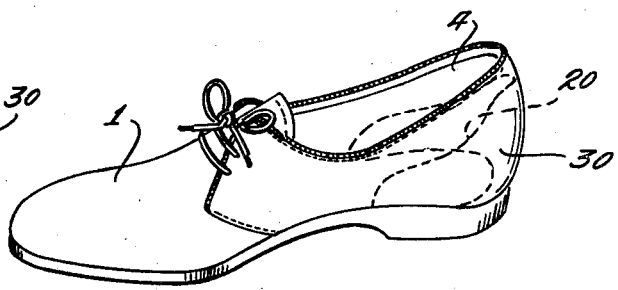
FIG.14
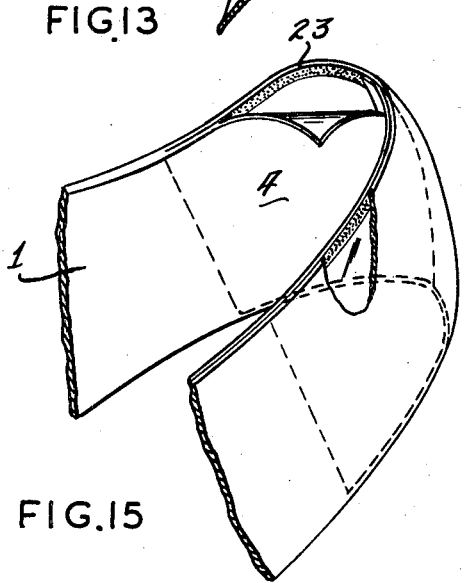
FIG.15
INVENTOR:
MARVIN S. JETT, JR.
BY
ATTORNEY.

3,496,585
METHOD OF MAKING A SHOE UPPER
Marvin S. Jett, Jr., Cuba, Mo., assignor to Brauer Bros. Shoe Company, St. Louis, Mo., a corporation of Missouri
Filed Apr. 29, 1968, Ser. No. 724,958
Int. Cl. A43d *11/00, 13/00;* A43b *23/00*
U.S. Cl. 12—146                    1 Claim

ABSTRACT OF THE DISCLOSURE

A counter pocket is formed by splitting quarters to form inner and outer quarter flaps. The back seam of the outer quarter flaps is closed without closing the inner quarter flaps. The top line is finished. The inner quarter flaps are lapped and closed or cemented. A counter is inserted in the pocket formed between the inner and outer quarter flaps, which are integral with the quarter leather, and the shoe is finished in the conventional manner.

BACKGROUND OF THE INVENTION

Conventionally, pockets for counters are made by closing the back seam of uppers, e.g., three quarters vamps and quarters, circular vamps and two quarters, or full seamless (no side seams), and sewing a counter pocket into the heel part of the quarter. A counter is inserted in the open bottomed pocket thus formed, and the shoe is lasted. In practice, the process is not as simple as has been indicated. Numerous steps are involved and considerable skill is required, and the process is therefore expensive. In addition, the existence, on the inside surface, of the counter pocket may tend to make the shoe less comfortable than if the inside surface of the shoe were completely smooth, as in a fully lined shoe.

One of the objects of this invention is to provide a shoe and a method for making it in which the process of forming a pocket for a counter is simplified and made more inexpensive than processes known heretofore.

Another object is to provide such a shoe and process in which the finished shoe is more elegant and comfortable than shoes with conventional counter pockets.

Other objects will become apparent to those skilled in the art in the light of the following description and accompanying drawing.

SUMMARY OF THE INVENTION

In accordance with this invention, generally stated, a method of manufacturing a shoe is provided, in which a pocket for a counter is formed, which comprises splitting a quarter to form inner and outer quarter flaps integral with the quarter leather, inserting a counter between the quarter flaps and finishing the shoe. When two quarters are used, the method includes closing the back seam of the outer quarter flaps without closing the inner quarter flaps; finishing the top line; closing or cementing the inner quarter flaps to form an open-bottomed pocket, inserting a counter and finishing the shoe which, again, can be in a conventional manner.

In the preferred embodiment, the method also includes trimming the heightwise edge of one of the inner quarter flaps; marking the other inner quarter flap to provide a counter allowance; and cementing the outer face of the trimmed quarter flap to the inside face of the marked quarter flap, lapping to the edge of the counter allowance trace.

The resulting shoe has a counter pocket which is formed integrally with the quarter. The only interruption of the inner surface of the quarter in the heel region is at the cemented seam between the two inner quarter flaps. However, the seam is vertical, and almost undetectable. If it is desired, the overlapping edge of the inner quarter flaps can be skived so as to make the overlapped part impalpable. The shoe thus has the appearance and feel of a fully lined shoe, and still has the provision of a counter pocket.

BRIEF DESCRIPTION OF THE DRAWING

In the drawing, FIGURE 1 is a top plan view, partly in perspective, of a three-quarter vamp with quarters split in an initial step of an illustrative example of process of this invention;

FIGURE 2 is a sectional view taken along the line 2—2 of FIGURE 1;

FIGURE 3 is a fragmentary view in perspective, somewhat stylized, representing the splitting step to produce the split quarters of the vamp shown in FIGURE 1;

FIGURE 4 is a fragmentary view in perspective, somewhat stylized, illustrating a subsequent step in the illustrative embodiment of process of this invention, in which one inner quarter flap is trimmed;

FIGURE 5 is a fragmentary view in perspective, somewhat stylized, illustrating another step in the illustrative embodiment of process of this invention in which the other inner quarter flap is marked for a counter allowance;

FIGURE 11 is a fragmentary view in side elevation, partly broken away and partly in section, showing the counter of FIGURE 10 in place in the pocket formed between the inner and outer quarter flaps as shown in FIGURE 9;

FIGURE 12 is a fragmentary view in side elevation, partly broken away and partly in section, showing the upper, of which the quarters shown are a part, being lasted;

FIGURE 13 is a fragmentary view in perspective showing the upper of FIGURE 12 after lasting;

FIGURE 14 is a view in perspective of an illustrative example of a finished shoe of this invention made in accordance with the illustrative embodiment of process of this invention but with a circular vamp; and FIGURE 15 is a fragmentary view in perspective, partly broken away, illustrating an alternative additional step in the manufacture of a shoe in accordance with the process of this invention.

DESCRIPTION OF THE PREFERRED EMBODIMENT

Figure 6:
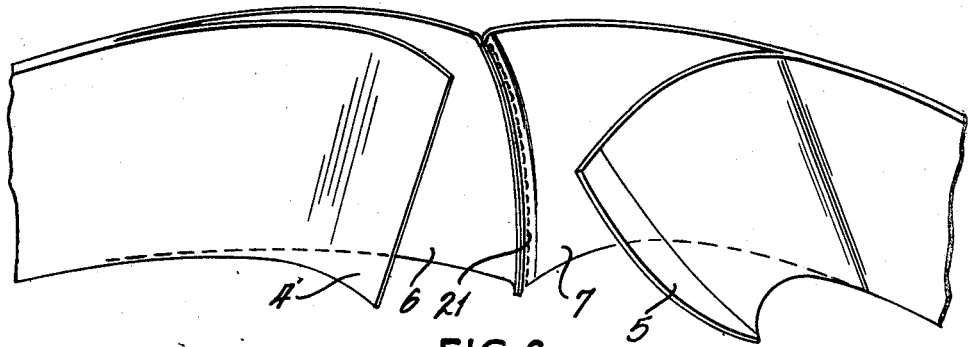
FIGURE 6 is a fragmentary view in perspective of quarters at a stage in the illustrative embodiment of process of this invention showing outer quarter flaps closed and inner quarter flaps loose.

Referring now to FIGURES 1–13 of the drawing, for a somewhat stylized illustration of the steps constituting a preferred embodiment of method of this invention, reference numeral 1 indicates a three-quarter vamp with quarters 2 and 3. Each of the quarters is split to provide inner quarter flaps 4 and 5 and outer quarter flaps 6 and 7 respectively.

In FIGURE 3, the quarter 2 is shown being split by a knife 10, though in commercial practice the splitting is accomplished by use of a band splitter.

In FIGURE 4, the inner flap 4 of the quarter 2 is shown in the process of being trimmed along a line 12 to shorten the inner quarter flap 4 with respect to the outer quarter flap 6.

In FIGURE 5, the inner quarter flap 5 is shown as being marked to provide a counter allowance trace. In commercial practice, once the counter allowance is determined, the marking can be done in the stage shown in FIGURE 4.

In FIGURE 6, a back seam 21 has been closed by sewing the outer quarter flaps 6 and 7 together, while the inner flaps 4 and 5 have been left loose.

Figure 7:
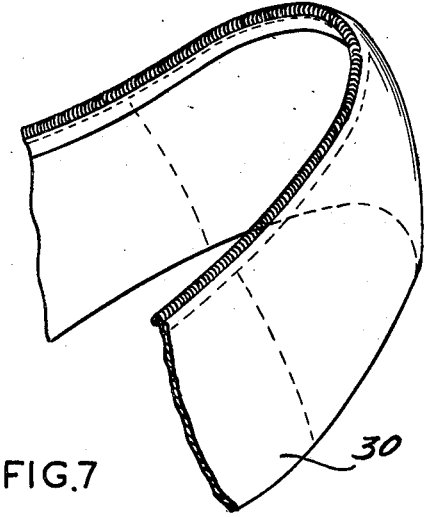
FIGURE 7 is a fragmentary view in perspective showing the quarters of FIGURES 5 and 6 at still another stage in the illustrative embodiment of process of this invention with the top line finished.
Figure 8:
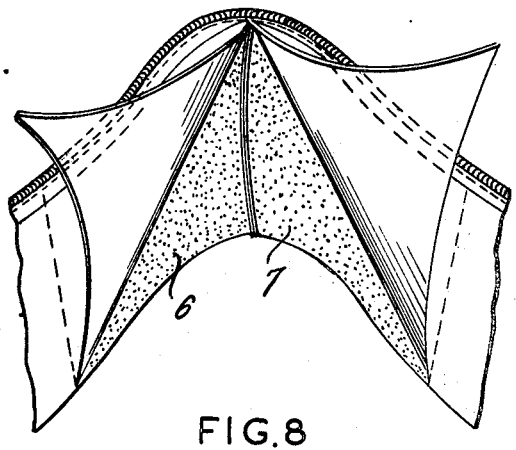
FIGURE 8 is a fragmentary view in perspective of the quarters shown in FIGURE 7, with inner quarter flaps, secured at their upper edges, pulled back to reveal a back seam.

In FIGURE 7, the top line of what is now an upper 30 has been finished by French binding. The particular type of finishing does not constitute a part of this invention, and the finishing can be done in any other desirable fashion, as by folding or English binding for example. When the top line has been finished, the inner quarter flaps are connected at their top edges to the outer quarter flaps, as shown in FIGURE 8.

Figure 9:
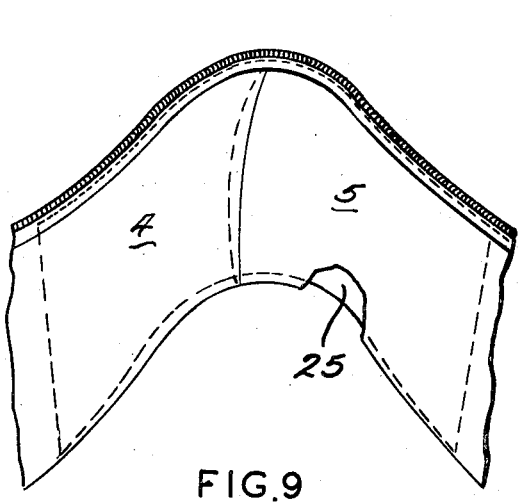
FIGURE 9 is a fragmentary view in perspective, partly broken away, showing the quarters of FIGURES 7 and 8 with the inner quarter flaps cemented to define a pocket with the outer quarter flaps.
Figure 10:
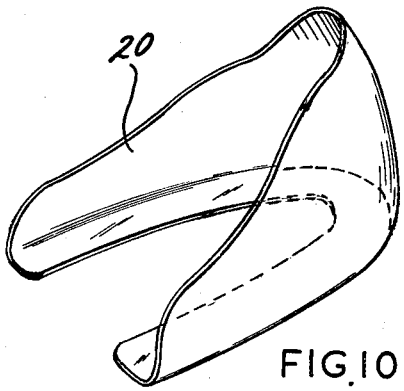
FIGURE 10 is a view in perspective of a conventional counter.

In FIGURE 9, a band of cement has been applied to the outer face of the trimmed inner quarter flap 4, the quarter flap 4 has been lapped over the inner quarter flap 5 to the counter allowance trace, and the two inner quarter flaps have been cemented together, to form an open bottomed pocket 25. The cement used can be any of the conventional cements now used in the shoe industry for the purpose of joining pieces of leather.

In FIGURE 11, a counter 20 has been inserted into the pocket 25, and in FIGURE 12, the shoe is being lasted, the last exerting pressure in the direction of the arrow to stretch the flaps 4 and 5 to finish the closing of the pocket, in the conventional manner.

In FIGURE 14, a shoe 40 of this invention, made with exactly the same steps, is shown. The shoe 40 has a circular vamp and two quarters, rather than a three-quarter vamp and is shown to illustrate that the invention is applicable to almost any variety of shoe in which a counter is used. The shoe 40 has a smooth inner lining interrupted only by a seam, such as a seam 35 shown in FIGURE 13, which is almost undetectable.

Referring now to FIGURE 15, it may be desirable in some circumstances to cement the top edges of the inner and outer quarter flaps, by means of a band of cement 23, before finishing the top line, merely to hold the two flaps in place during the finishing operation. This additional step is illustrated in FIGURE 15.

Numerous variations within the scope of the appended claims will occur to those skilled in the art in the light of the foregoing disclosure. Merely by way of example, if the leather of the quarters is split from the bottom edge toward but not through the top edge, the top of the quarter flaps would not have to be closed in any separate step. The inner quarter flaps need neither be trimmed on one side nor marked on the other provided, in the first instance, a long overlap is tolerable, and in the second, that someone with sufficient skill to know how far the two should be overlapped is doing the joining. These are merely illustrative.

Having thus described the invention, what is claimed and desired to be secured by Letters Patent is:

1. The method of making a shoe comprising splitting a quarter through a part of its extent to form inside and outside quarter flaps integral with the quarter, closing a back seam with the two outside quarter flaps, finishing the top edges of the quarter including uniting the top edges of the inside and outside flaps to provide a finished top line of the quarter, thereafter cementing the two inside quarter flaps together in edge overlapping relation to define between the inside and outside quarter flaps an open-bottomed counter receiving pocket, inserting a counter into said pocket through the open bottom and thereafter closing said pocket.

References Cited

UNITED STATES PATENTS 2,955,366 10/1960 Zuckerman _____ 36—46.5

FOREIGN PATENTS 787,077 6/1968 Canada.
298,895 11/1928 Great Britain.
270,959 5/1927 Great Britain.

ALFRED R. GUEST, Primary Examiner

U.S. Cl. X.R.

36—46.5, 68